US008221716B2

(12) United States Patent
Jeong et al.

(10) Patent No.: US 8,221,716 B2
(45) Date of Patent: Jul. 17, 2012

(54) METHOD OF SYNTHESIZING CARBON NANOTUBES

(75) Inventors: Soo-Hwan Jeong, Yongin-si (KR); Wan-Jun Park, Seoul (KR); Jong-Bong Park, Osan-si (KR); Ju-Hye Ko, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 916 days.

(21) Appl. No.: 11/281,472

(22) Filed: Nov. 18, 2005

(65) Prior Publication Data

US 2006/0239892 A1    Oct. 26, 2006

(30) Foreign Application Priority Data

Nov. 20, 2004   (KR) .................. 10-2004-0095548

(51) Int. Cl.
*D01F 9/12*   (2006.01)
(52) U.S. Cl. .................... 423/447.1; 977/842
(58) Field of Classification Search ............... 423/447.1; 977/842
See application file for complete search history.

(56) References Cited

U.S. PATENT DOCUMENTS 4,816,289 A * 3/1989 Komatsu et al. ........... 423/447.3
6,806,397 B1  10/2004 Reilly

FOREIGN PATENT DOCUMENTS

| JP | 11-43316 | 2/1999 |
| JP | 11-043316 | 2/1999 |
| KR | 10-2002-0023522 | 3/2002 |
| KR | 1020020023522 | 3/2002 |

OTHER PUBLICATIONS

Office Action for corresponding Korean Application No. 10-2004-0095548 dated Apr. 27, 2006 and English translation thereof.
Chinese Office Action dated Sep. 11, 2009 in corresponding Chinese Application No. 2005101267398 with English translation.
Chinese Office Action and English translation dated Jun. 2, 2011.
Japanese Office Action issued Aug. 2, 2011, in corresponding Japanese Patent Application No. 2005-335190.
Soo-Hwan Jeong et al. "A Sonochemical Route to Single-Walled Carbon Nanotubes under Ambient Conditions, " J. Am. Chem. Soc., vol. 126, Iss. 49, p. 15982-15983 (2004).
Koda et al., "Sonochemistry," *Journal of Electronics, Information and Communication Engineering*, vol. 82, No. 6, pp. 587-591 (Jun. 1999) (with English translation).
Junichi et al., "Designing of Nanostructure by Chemical Methods," *Basic Structure Group, Applied Chemistry* (Dec. 17, 1993) (with English translation).
Sawada, "A Microgravity Experiment of Crystal Growth Utilizing High Speed of Pressure-Control," *Rev. High Pressure Sci. Technol.*, vol. 6, No. 3, pp. 148-153 (1997)—Abstract.
Mashimo, "Generation of a New Extreme Condition: Ultra-Strong Acceleration Field (Mega-Gravity Field) and the Applications to Material Science," *Rev. High Pressure Sci. Technol.*, vol. 6, No. 3, pp. 154-158 (1997)—Abstract.
Katoh, "Decomposition of Organic Liquids by Ultrasound," *Rev. High Pressure Sci. Technol.*, vol. 6, No. 3, pp. 159-166 (1997)—Abstract.
Yakushi et al., "Pressure-Induced Charge Transfer in Phthalocyanine Conductors," *Rev. High Pressure Sci. Technol.*, vol. 6, No. 3, pp. 167-175 (1997)—Abstract.
Miura et al., "Solubility Measurements of High Pressure $CO_2$ into polystyrene by Quartz Crystal Microbalance," Rev. High Pressure Sci. Technol., vol. 6, No. 3, pp. 176-181 (1997)—Abstract.
Yanazaki, "Story of Development of High-Pressure Processed Foods, Part 2—A method of producing rapidly cookable processed unpolished rice," *Rev. High Pressure Sci. Technol.*, vol. 6, No. 3, pp. 182-186 (1997)—Abstract.
Koda et al., "Sonochemistry," *The Institute of Electronics, Information and Communication Engineers*, vol. 82, No. 6, p. 587-591 Abstract, Dec. 17, 2003.
Japan Society of Sonochemistry, "The 6th Annual Meeting of the Japan Society of Sonochemistry," Oct. 16-17, 1997.

* cited by examiner

*Primary Examiner* — Stuart Hendrickson
(74) *Attorney, Agent, or Firm* — Harness, Dickey & Pierce, P.L.C.

(57)   ABSTRACT

A method of synthesizing carbon nanotubes including forming a solution including an organometallic compound containing catalyst particles and a solvent, adding at least one support to the solution, wherein the carbon nanotubes are synthesized on a surface of the at least one support, and applying radiation to the solution to which the at least one support is added.

10 Claims, 4 Drawing Sheets

70

72

METHOD OF SYNTHESIZING CARBON NANOTUBES

PRIORITY STATEMENT

This application claims the benefit of Korean Patent Application No. 10-2004-0095548, filed on Nov. 20, 2004, in the Korean Intellectual Property Office, the disclosure of which is incorporated herein in its entirety by reference.

BACKGROUND OF THE INVENTION

1. Field of the Invention

Example embodiments of the present invention relate to a method of synthesizing a material, and more particularly, to a method of synthesizing carbon nanotubes.

2. Description of the Related Art

A carbon nanotube may have a tube structure with a diameter of several nm. Carbon nanotubes may be categorized as single-wall nanotubes having one wall and multi-wall nanotubes having two or more walls. A carbon nanotube may have a different structure from other conventional materials and may have unique physical properties. For example, a carbon nanotube may be an electrical conductor or a semiconductor, depending on its structure.

Carbon nanotubes may be applied to various fields due to their unique shape and/or electrical properties. For example, a carbon nanotube may be used as an emission tip of a field emission display (FED), a quantum wire, a hydrogen storage container and an SPM probe, and may be used in nano-semiconductor devices, nanochemistry and biosensors, fuel cells, and/or other applications.

Known methods of synthesizing carbon nanotubes (hereinafter referred to as conventional synthesis methods) may include arc discharging, a laser vaporization, a chemical vapor deposition (CVD), and/or other methods.

In conventional synthesis methods, carbon nanotubes may be synthesized at high temperature and/or low pressure. Therefore, to use conventional synthesis methods, separate equipment for synthesizing the carbon nanotubes in which high temperature and/or low pressure processing conditions can be attained may be required.

Further, in conventional synthesis methods, undesired byproducts, for example, carbon particles, carbon nanoparticles, amorphous carbon, and multi-wall carbon nanotubes, may be formed together with the single-wall carbon nanotubes. Thus, to obtain the single-wall carbon nanotubes, a complicated purification process may also be required.

When synthesizing single-wall carbon nanotubes using the conventional synthesis methods, separate synthesis equipment may be required and/or a complicated purification process may be required, and thus mass-production may be more difficult and/or production costs may be higher.

SUMMARY OF THE INVENTION

Example embodiments of the present invention provide a method of synthesizing carbon nanotubes.

Example embodiments of the present invention provide a method of synthesizing single-wall carbon nanotubes at room temperature and atmospheric pressure.

According to an example embodiment of the present invention, there is provided a method of synthesizing carbon nanotubes, the method including forming a solution including an organometallic compound containing catalyst particles and a solvent, adding at least one support to the solution, wherein the carbon nanotubes are synthesized on a surface of the at least one support, and applying radiation to the solution to which the at least one support is added.

In an example embodiment, the solvent is an organic compound.

In an example embodiment, the solvent acts as a carbon supply source.

In an example embodiment, the catalyst particles are Fe particles.

In an example embodiment, the organometallic compound is one of metallocene ($M(C_5H_5)_2$, M=Ti, V, Cr, Fe, Co, Ni, Ru, Os, or Pd,) and metal carbonyl.

In an example embodiment, the metal carbonyl is metal-pentacarbonyl ($M(CO)_5$, where M is a metal.

In an example embodiment, the organic compound is one of xylene, benzene and ether which acts as a solvent for the organometallic compound and a carbon supplying source.

In an example embodiment, the at least one support is made of silica powder.

In an example embodiment, the carbon nanotubes are single-wall carbon nanotubes.

In an example embodiment, the radiation includes at least one of ultrasonic and electromagnetic waves.

In an example embodiment, at least one of the forming, adding, and applying are conducted at room temperature and atmospheric pressure.

In an example embodiment, at least one of the adding and applying are conducted at room temperature and atmospheric pressure.

In an example embodiment, the applying is conducted at room temperature and atmospheric pressure.

When using a method according to an example embodiment of the present invention, carbon nanotubes may be mass-produced at lower costs, and thus the commercialization of carbon nanotubes may be achieved.

BRIEF DESCRIPTION OF THE DRAWINGS

The present invention will become more apparent by describing in detail example embodiments thereof with reference to the attached drawings in which.

DETAILED DESCRIPTION OF EXAMPLE EMBODIMENTS OF THE INVENTION

Figure 1:
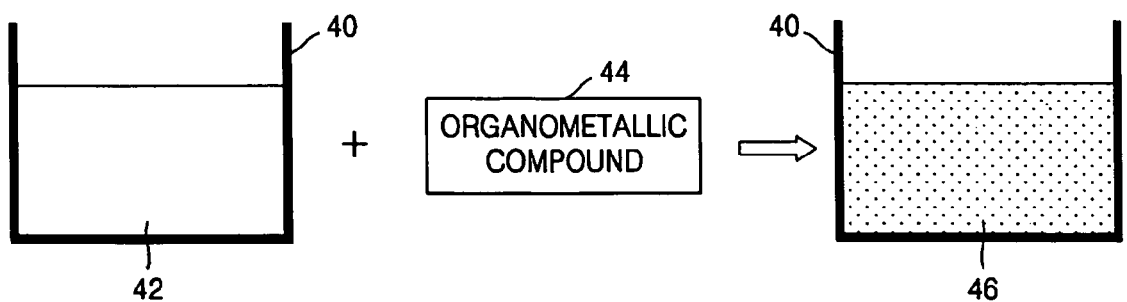
FIGS. 1 through 3 schematically illustrate a method of synthesizing carbon nanotubes according to an example embodiment of the present invention.

The present invention will now be described more fully with reference to the accompanying drawings, in which example embodiments of the invention are shown. In the drawings, the thicknesses of layers and regions are exaggerated for clarity.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

Referring to FIG. 1, a solvent 42 may be placed in a container 40 to a desired height. The solvent 42 may be an organic compound which can dissolve an organometallic compound. For example, the organic compound may be an aromatic compound such as xylene, benzene, ether, other aromatic compound, or other solvent. A desired amount of an organometallic compound 44 may be dissolved in the container 40, in which the solvent 42 is placed, to prepare a solution 46 containing an organic metal. The organometallic compound 44 may be a metallocene ($M(C_5H_5)_2$, M=Ti, V, Cr, Fe, Co, Ni, Ru, Os, Pd, etc.), for example, ferrocene ($Fe(C_5H_5)_2$), cobaltcene, titanocene, vanadocene, or nickelocene. The organometallic compound 44 may also be metal carbonyl, for example, metalpentacarbonyl ($M(CO)_5$, where M is a metal).

The organometallic compound 44 may be used as a precursor of a catalyst for promoting the synthesis of carbon nanotubes. The solvent 42 may act as a carbon supply source in the synthesis of carbon nanotubes.

Figure 2:
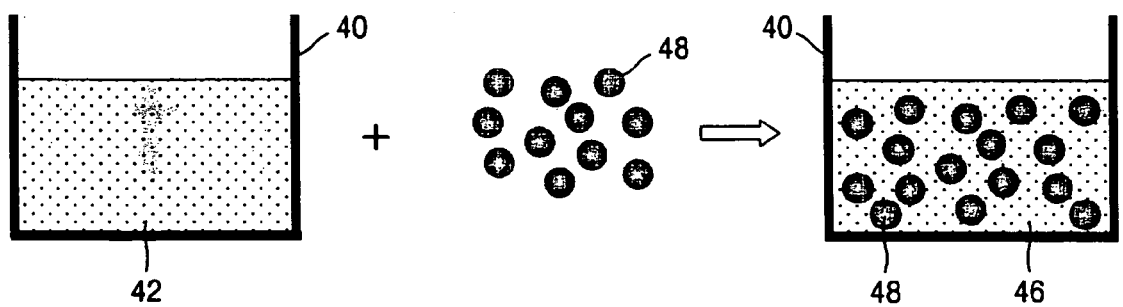

Referring to FIG. 2, supports 48 may be added to the solution 46. The supports 48 may be uniformly distributed in the solution 46. In a subsequent synthesis process, carbon nanotubes may be synthesized on a surface of the supports 48. The supports 48 may be silica ($SiO_2$) powder.

Figure 3:
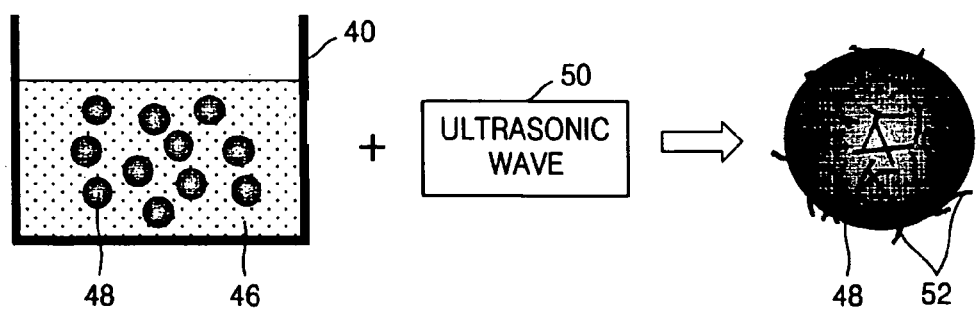

Referring to FIG. 3, ultrasonic waves 50 may be irradiated on the solution 46 containing the supports 48 for a desired time.

Although the ultrasonic waves 50 are irradiated on the solution 46 containing supports 48, the solution 46 is maintained at room temperature and atmospheric pressure.

Micro-bubbles may be formed in the solution 46 and the internal temperature and pressure of the micro-bubbles may be above atmospheric pressure. Due to the formation of the micro-bubbles, the organometallic compound 44 dissolved in the solution 46 may decompose to generate catalyst particles, for example, Fe. Single-wall carbon nanotubes may be synthesized on the surface of the support 48 due to the catalyst particles. A bundle 52 of carbon nanotubes formed with the above method is illustrated in FIG. 3.

Figure 4:
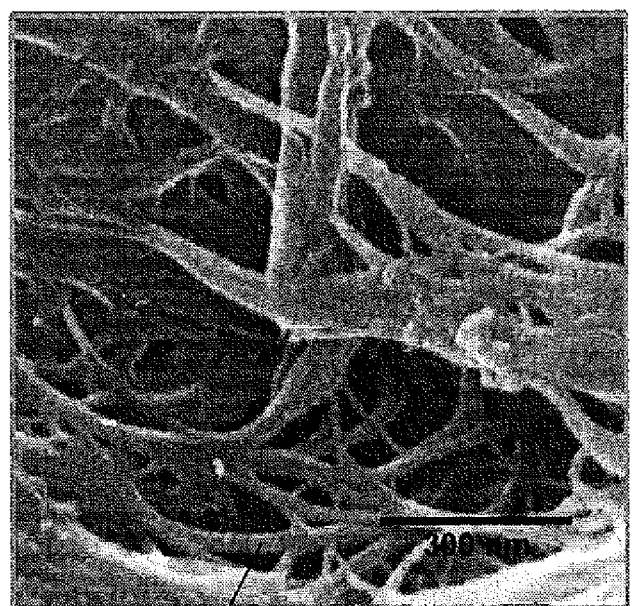
FIGS. 4 and 5 are a SEM image and a TEM image of single-wall carbon nanotubes formed according to an example embodiment of the present invention.
Figure 5:
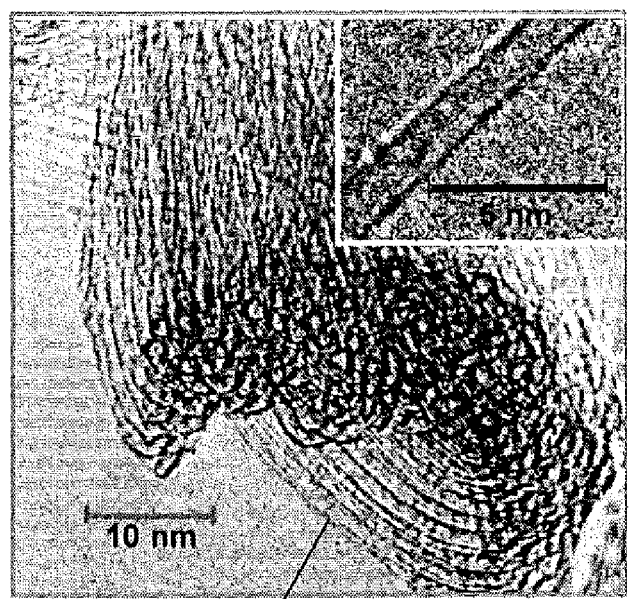

FIGS. 4 and 5 are a SEM image and a TEM image of single-wall carbon nanotubes separated from supports 48 and filtered. A bundle 70 of carbon nanotubes is illustrated in FIG. 4 and a single carbon nanotube 72 is illustrated in FIG. 5.

Figures 6A, 6B:
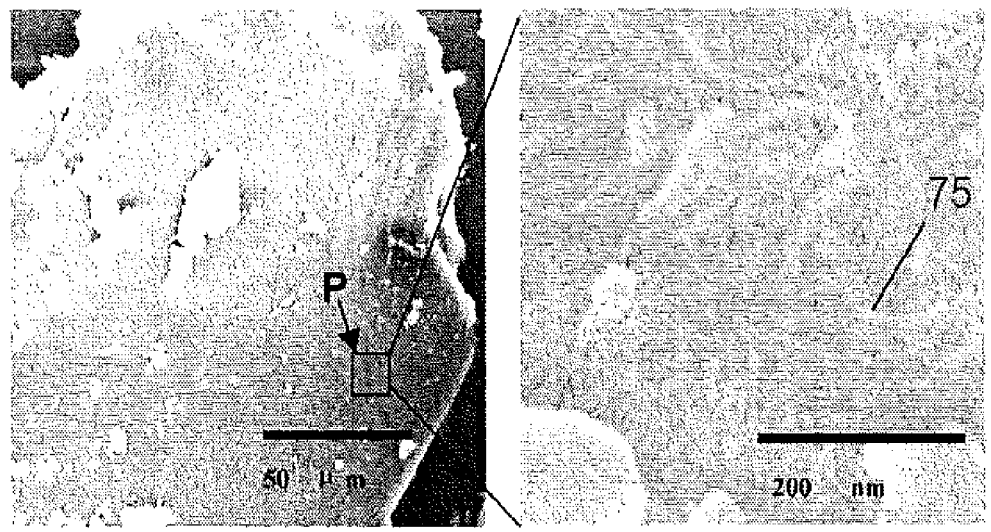
FIGS. 6 and 7 are a SEM image and a TEM image of single-wall carbon nanotubes formed according to an example embodiment of the present invention attached to silicon powder.
Figure 7:
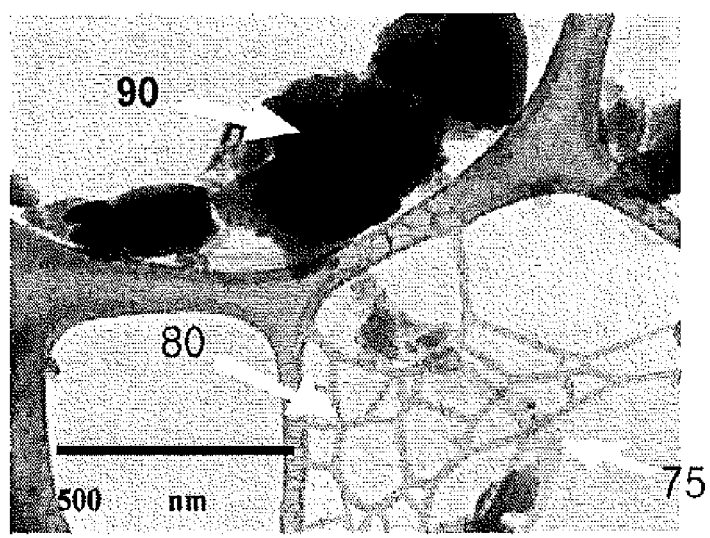

FIGS. 6A and 7 are a SEM image and a TEM image of carbon nanotubes which are not separated from the supports 48. FIG. 6B is an enlarged view of portion P in FIG. 6A. A bundle 75 of carbon nanotubes is illustrated in FIGS. 6B and 7. Silica powder 90 and a grid 80 of the TEM are illustrated in FIG. 7.

Figure 8:
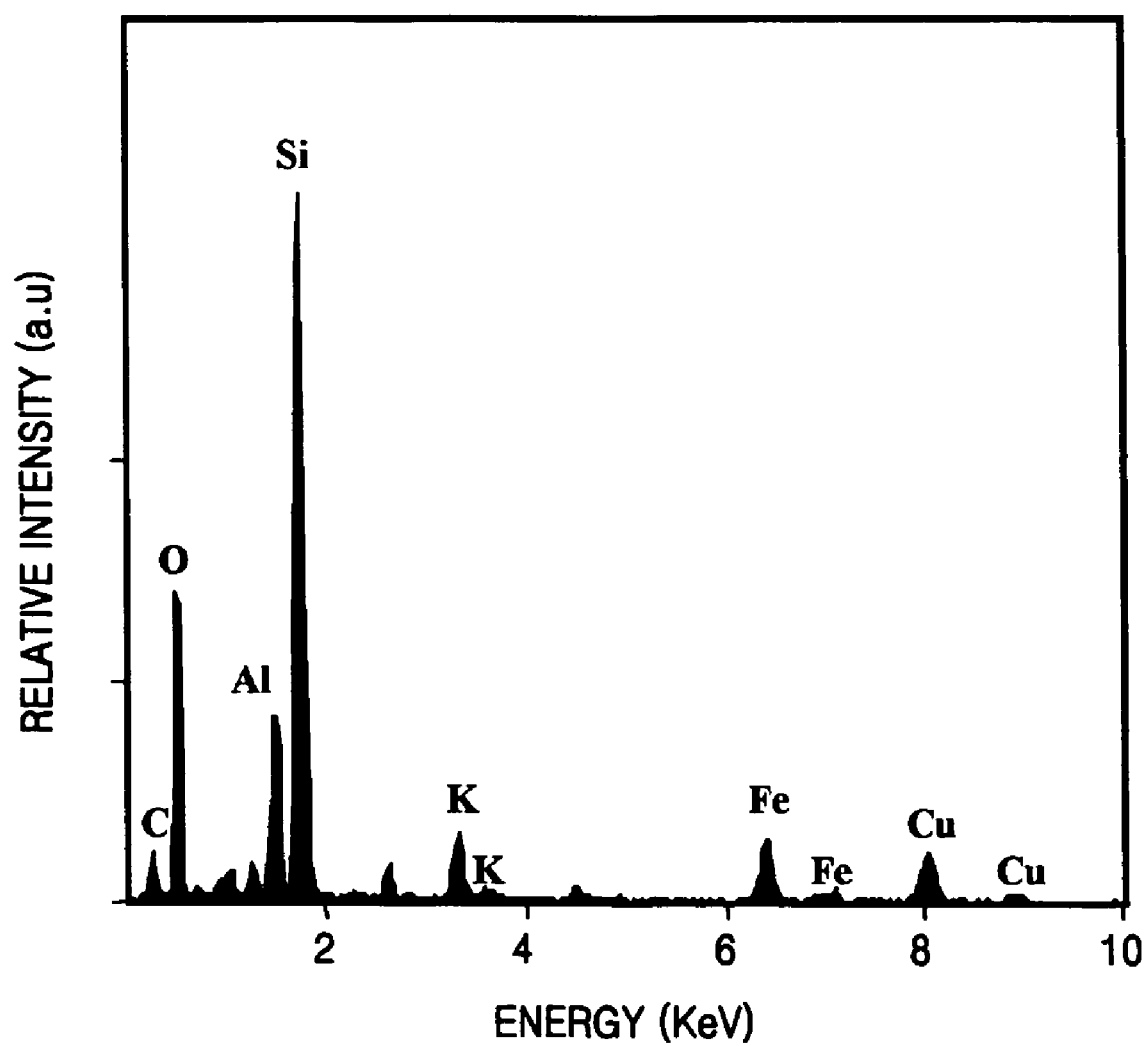
FIG. 8 is a graph illustrating energy dispersive X-ray spectral characteristics at a solution after applying ultrasonic waves according to an example embodiment of the present invention.

FIG. 8 illustrates spectral characteristics of the solution 46 measured using an energy dispersive X-ray spectroscopy attached to a TEM after applying ultrasonic waves.

Referring to FIG. 8, spectral characteristics for Fe are observed, indicating that Fe is generated as the catalyst particle in the solution 46 after applying ultrasonic waves.

As described above, example embodiments of the present invention provide a method of synthesizing carbon nanotubes, for example, single-wall carbon nanotubes using ultrasonic waves at room temperature and atmospheric pressure. Therefore, when using the method of example embodiments of the present invention, carbon nanotubes, for example, single-wall nanotubes, may be mass-produced at lower cost and the commercialization of carbon nanotubes, for example, single-wall nanotubes, may be more easily achieved because complicated separation and purification processes may not be required.

While example embodiments of the present invention has been particularly shown and described with reference to embodiments thereof, it will be understood by those skilled in the art that various changes in form and details may be made therein without departing from the spirit and scope of the invention as defined by the appended claims.

For example, ultrasonic waves with other frequency bands or other electromagnetic waves can be used, and ultrasonic waves or electromagnetic waves can be used at a temperature and a pressure slightly different from room temperature and atmospheric pressure. Also, the solution 46 or the supports 48 may be changed while maintaining the use of ultrasonic waves. Therefore, the scope of example embodiments of the present invention is defined not by the detailed description of example embodiments of the present invention but by the appended claims.

What is claimed is:

1. A method of synthesizing carbon nanotubes, the method comprising:
    forming a solution including an organometallic compound containing catalyst particles and a solvent;
    adding at least one support to the solution; and
    applying radiation to the solution to which the at least one support is added, after adding the at least one support to the solution,
    wherein the carbon nanotubes are synthesized on a surface of the at least one support by applying the radiation to the solution and wherein the radiation includes one of ultrasonic and electromagnetic waves.

2. The method as claimed in claim 1, wherein the solvent is an organic compound.

3. The method as claimed in claim 1, wherein the solvent acts as a carbon supply source.

4. The method as claimed in claim 1, wherein the catalyst particles are Fe particles.

5. The method as claimed in claim 1, wherein the organometallic compound is one of metallocene ($M(C_5H_5)_2$, M=Ti, V, Cr, Fe, Co, Ni, Ru, Os, or Pd) and metal carbonyl.

6. The method as claimed in claim 5, wherein the metal carbonyl is metalpentacarbonyl ($M(CO)_5$, where M is a metal.

7. The method as claimed in claim 2, wherein the organic compound is one of xylene, benzene and ether which acts as a solvent for the organometallic compound and a carbon supplying source.

8. The method as claimed in claim 1, wherein the at least one support is made of silica powder.

9. The method as claimed in claim 1, wherein the carbon nanotubes are single-wall carbon nanotubes.

10. The method as claimed in claim 1, wherein at least one of the forming, adding, and applying are conducted at room temperature and atmospheric pressure.

* * * * *